(12) United States Patent
Su et al.

(10) Patent No.: US 10,868,333 B2
(45) Date of Patent: Dec. 15, 2020

(54) ELECTROLYTES FOR LITHIUM BATTERIES

(71) Applicant: UChicago Argonne, LLC, Chicago, IL (US)

(72) Inventors: Chi Cheung Su, Westmont, IL (US); Khalil Amine, Oakbrook, IL (US); Meinan He, Sterling Heights, MI (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 99 days.

(21) Appl. No.: 16/255,621

(22) Filed: Jan. 23, 2019

(65) Prior Publication Data
US 2020/0235430 A1 Jul. 23, 2020

(51) Int. Cl.
H01M 10/0567 (2010.01)
H01M 10/0565 (2010.01)
H01M 10/052 (2010.01)
H01M 10/0569 (2010.01)
H01M 10/0568 (2010.01)
H01M 12/08 (2006.01)

(52) U.S. Cl.
CPC ..... *H01M 10/0567* (2013.01); *H01M 10/052* (2013.01); *H01M 10/0565* (2013.01); *H01M 10/0568* (2013.01); *H01M 10/0569* (2013.01); *H01M 12/08* (2013.01); *H01M 2300/0025* (2013.01); *H01M 2300/0085* (2013.01)

(58) Field of Classification Search
CPC .......... H01M 10/052; H01M 10/0565; H01M 10/0567; H01M 10/0568; H01M 10/0569; H01M 12/08; H01M 2300/0025; H01M 2300/0085
See application file for complete search history.

(56) References Cited

U.S. PATENT DOCUMENTS

| 5,916,708 A | 6/1999 | Besenhard et al. |
| 6,566,015 B1 | 5/2003 | Yamada et al. |
| 2007/0054186 A1 | 3/2007 | Costello et al. |
| 2018/0076485 A1 | 3/2018 | Zhang et al. |
| 2019/0326639 A1* | 10/2019 | Kinoshita .............. H01G 11/64 |

FOREIGN PATENT DOCUMENTS

WO   WO-2015/160334 A1   10/2015

OTHER PUBLICATIONS

Jiao et al., "Stable cycling of high-voltage lithium metal batteries in ether electrolytes," Nature Energy 2018 (8 pages).

* cited by examiner

Primary Examiner — Carlos Barcena
(74) Attorney, Agent, or Firm — Foley & Lardner LLP

(57) ABSTRACT

An electrochemical cell includes a cathode active material, lithium metal, a separator, and an electrolyte including a lithium salt and a fluorinated glycol ether.

19 Claims, 3 Drawing Sheets

US 10,868,333 B2

ELECTROLYTES FOR LITHIUM BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to lithium rechargeable batteries. More particularly the technology relates to the use of fluorinated glycol ethers in an electrochemical cell having a metallic lithium anode.

SUMMARY

In one aspect, an electrochemical cell is provided having a a cathode comprising a cathode active material; an anode comprising silicon, a graphite, lithium metal, or a combination of any two or more thereof; a separator; and an electrolyte comprising a lithium salt and a fluorinated glycol ether and a fluorinated cyclic carbonate. In some embodiments, the electrochemical cell is a lithium battery.

DETAILED DESCRIPTION

Figure 1:
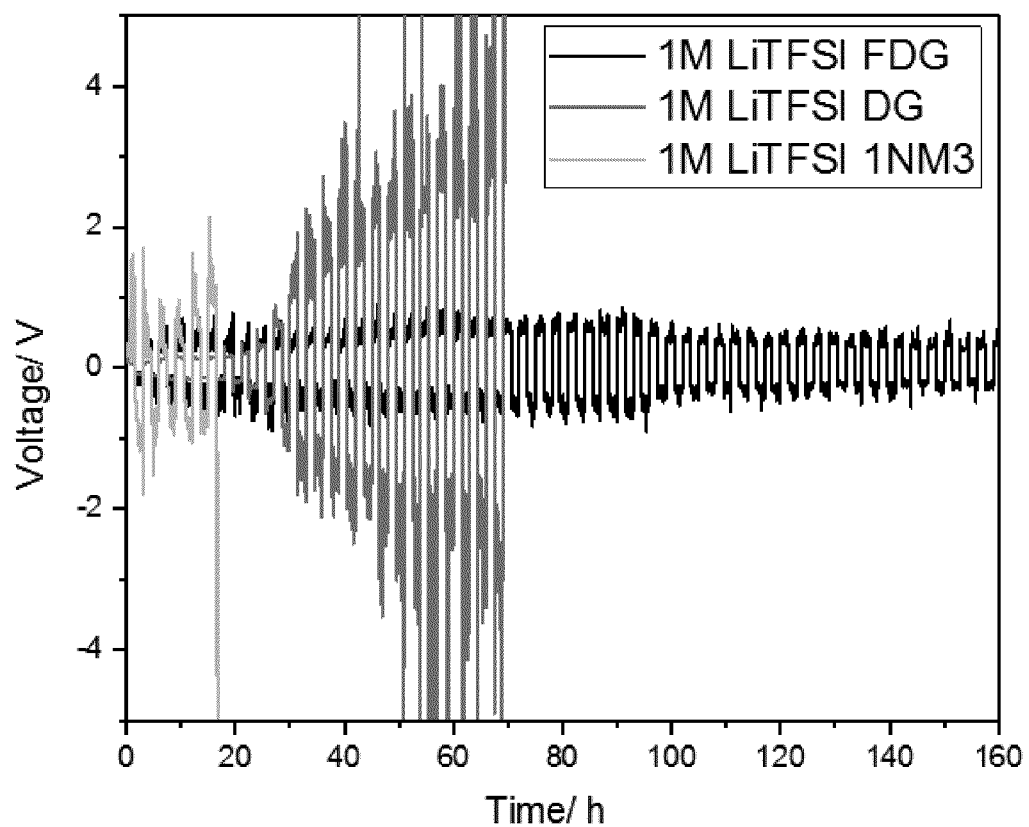
FIG. 1 is a graph of cycling performance of Li/Li symmetric cells using different electrolytes, according to Example 2.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. It should be noted that unless otherwise indicated any alkyl, alkenyl, alkynyl, aryl, ether, ester, or the like may be substituted, whether indicated as substituted or not. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

It has now been found that fluorinated glycol ether ("glyme")-based electrolytes exhibit outstanding electrochemical performance and stability in lithium metal-based electrochemical cells in comparison to electrochemical cells prepared with conventional (i.e. non-fluorinated carbonate type) systems. Without being bound by theory, it is believed that in the conventional systems, lithium dendrites tend to form and plug up separators. In contrast, in the fluorinated glyme-based electrolytes dendrite formation is suppressed or eliminated. It has also been observed that where an electrolyte includes both a fluorinated glyme and a fluorinated cyclic carbonate, the cycling stability of lithium ion batteries is significantly improved when compared to conventional systems.

In one aspect, an electrochemical cell includes a cathode comprising a cathode active material, an anode comprising lithium metal, a separator, and an electrolyte comprising a lithium salt and a fluorinated glycol ether.

As used herein, the term fluorinated glycol ether refers to polyether compounds having a least 2 repeating ethyloxy, propyloxy, butyloxy, or a combination there of, groups capped by alkyl groups, where at least one fluorine atom is present in the compound. Illustrative fluorinated glycol ethers may be those represented as Formula (I):

$$R^1(O(CH_2)_m)_x(O(CH_2)_n)_yOR^2 \qquad (I).$$

In Formula (I), $R^1$ is fluorinated alkyl, $R^2$ is fluorinated alkyl, m and n are individually 0, 1, 2, 3, or 4, and x and y are 0 to 10, however both x and y cannot be 0. In some embodiments, $R^1$ and $R^2$ may be at least difluorinated alkyl, and in other embodiments, they are at least trifluorinated alkyl. In Formula (I), according to various embodiments, $R^1$ and $R^2$ may individually be —$(CH_2)_q(CR^4R^5)_pC(R^3)_3$, where each $R^3$, $R^4$, and $R^5$ is individually H or F, with the proviso that at least one of $R^3$, $R^4$, and $R^5$ is F, and where q is 0, 1, 2, or 3, and p is 0, 1, 2, 3, 4, 5, or 6. In some embodiments, $R^1$ and $R^2$ may be individually-$(CH_2)_q(CR^4R^5)_pC(R^3)_3$, where $R^3$ is F, q is 1 or 2, and p is 0. In yet other embodiments, $R^1$ and $R^2$ may be individually-$(CH_2)_q(CR^4R^5)_pC(R^3)_3$, where each $R^3$, $R^4$, and $R^5$ is individually H or F, with the proviso that at least one of $R^3$, $R^4$, and $R^5$ is F, y is 0, x is 2, 3, 4, 5, or 6, m is 1, 2, or 3, q is 0, 1, 2, or 3, and p is 0, 1, 2, 3, 4, 5, or 6. In further embodiments, $R^1$ and $R^2$ are individually-$(CH_2)_q(CR^4R^5)_pC(R^3)_3$, $R^3$ is F, y is 0, x is 2, 3, or 4, m is 1, 2, or 3, q is 1 or 2, and p is 0. In yet further embodiments, $R^1$ and $R^2$ may be individually-$(CH_2)_q(CR^4R^5)_pC(R^3)_3$, where q is 1, p is 0, $R^3$ is F, y is 0, x is 2 or 3, and m is 2.

FDG is an illustrative example of a fluorinated glycol ether:

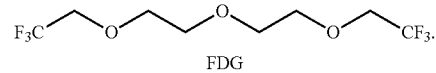 [SMILES: FC(F)(F)COCCOCCOCC(F)(F)F]

FDG

"FDG" is fluorinated diethylene glycol. The ethylene oxide units may be repeated to have a fluorinated triethylene glycol, or the ethylene glycol units may be replaced with propylene glycol units (i.e. fluorinated di- (or tri-)propylene glycol).

The electrochemical cells described herein may also include in the electrolyte a fluorinated cyclic carbonate. Illustrative examples of fluorinated cyclic carbonates may include those represented as Formula (II):

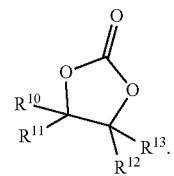

In Formula (II), each of $R^{10}$, $R^{11}$, $R^{12}$, and $R^{13}$ is individually, H, F, Cl, Br, I, CN, NO$_2$, alkyl, alkenyl, aryl, aralkyl, heterocyclyl, heteroaryl, or heteroaralkyl, with the proviso that at least one of $R^{10}$, $R^{11}$, $R^{12}$, and $R^{13}$ is F or contains F. In some embodiments, each of $R^{10}$, $R^{11}$, $R^{12}$, and $R^{13}$ is individually, H, F, $C_1$-$C_8$ alkyl, or $C_1$-$C_8$ fluoroalkyl. In some other embodiments, each of $R^{10}$, $R^{11}$, and $R^{12}$ are H and $R^{13}$ is F; or wherein each of $R^{10}$ and $R^{11}$ are H, and $R^{12}$ and $R^{13}$ are F; or wherein each of $R^{11}$ and $R^{12}$ are H, and $R^{10}$ and $R^{13}$ are F; or wherein any 3 of $R^{10}$, $R^{11}$, $R^{12}$ and $R^{13}$ are F while the remaining one is H; or wherein each of $R^{10}$, $R^{11}$, $R^{12}$, and $R^{13}$ are F.

By way of illustration, some examples of a fluorinated cyclic carbonate are, either singly or a mixture of any two or more thereof:

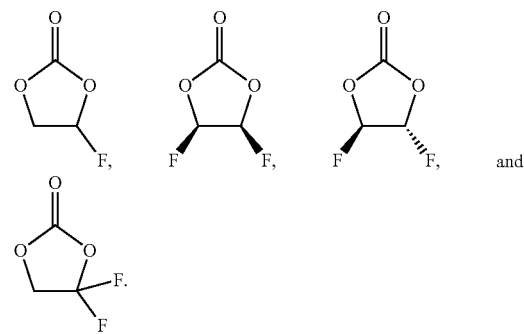

Where the electrolyte includes both a fluorinated glycol ether and a fluorinated cyclic carbonate, the ratio may be from 1:10 to 1:1, respectively. This includes ratios of from 1:4 to 1:2, from 3:7 to 1:1, respectively. In some embodiments, the ratio is about 3:7, respectively.

Suitable lithium salts for the electrolyte may include, but are not limited to, $LiBF_2(C_2O_4)$; $LiB(C_2O_4)_2$; $LiPF_2(C_2O_4)_2$; $LiPF_4(C_2O_4)$; $LiPF_6$; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; lithium 4,5-dicyano-2-(trifluoromethyl)imidazole; lithium 4,5-dicyano-2-methylimidazole; trilithium 2,2',2"-tris(trifluoromethyl)benzotris(imidazolate); $Li(CF_3CO_2)$; $Li(C_2F_5CO_2)$; $LiCF_3SO_3$; $LiCH_3SO_3$; $LiN(SO_2CF_3)_2$; $LiC(CF_3SO_2)_3$; $LiN(SO_2C_2F_5)_2$; $LiClO_4$; $LiBF_4$; $LiAsF_6$; $LiPF_6$; $LiPF_2(C_2O_4)_2$; $LiPF_4(C_2O_4)$; $LiB(C_2O_4)_2$; $LiBF_2(C_2O_4)_2$; $Li_2(Bi_{12}X_{12-i}H_i)$; $Li_2(B_{10}X_{10-i'}H_{i'})$; and a mixture of any two or more thereof, wherein X is independently at each occurrence a halogen, i is an integer from 0 to 12 and i' is an integer from 0 to 10. The salt may be present in the electrolyte at a concentration from about 0.5M to 2M.

The electrochemical cells described herein may also include in the electrolytes, an electrolyte stabilizing additive that may be $LiBF_2(C_2O_4)$, $LiB(C_2O_4)_2$, $LiPF_2(C_2O_4)_2$, $LiPF_4(C_2O_4)$ $LiPF_6$, $LiAsF_6$, CsF, $CsPF_6$, $LiN(SO_2CF_3)_2$, $LiN(SO_2F)_2$, $Li_2(B_{10}X_{12-i}H_i)$, $Li_2(b_{10}X_{10-i'}H_{i'})$, or a mixture of any two or more thereof. In such additives, each X is independently at each occurrence a halogen, i is an integer from 0 to 12 and i' is an integer from 0 to 10.

In further embodiments, the electrolyte may further include an aprotic gel polymer. For example, mixtures of poly(ethylene oxide) (PEO) with lithium salts and an organic aprotic solvent may be used.

In some embodiments, the electrolyte may also contain an electrode stabilizing additive such as but is not limited to $LiB(C_2O_4)_2$, $LiBF_2(C_2O_4)_2$, vinylene carbonate, vinyl ethylene carbonate, propargylmethyl carbonate, 1,3,2-dioxathiolane-2,2-dioxide, ethylene sulfite, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, anisoles, 2,5-dimethyl-1,4-dimethoxybenzene, 2,3,5,6-tetramethyl-1,4-dimethoxybenzene, 2,5-di-tert-butyl-1,4-dimethoxybenzene, or a mixture of two or more thereof. However, where the electrode stabilizing additive contains lithium, and when used, it is not the same as the lithium salt.

In some embodiments, the electrolyte may also include a redox shuttle material. The shuttle, if present, will have an electrochemical potential above the positive electrode's maximum normal operating potential. Illustrative stabilizing agents include, but are not limited to, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, lithium alkyl fluorophosphates, lithium alkyl fluoroborates, lithium 4,5-dicyano-2-(trifluoromethyl)imidazole, lithium 4,5-dicyano-2-methylimidazole, trilithium 2,2',2"-tris(trifluoromethyl) benzotris(imidazolate), $Li(CF_3CO_2)$, $Li(C_2F_5CO_2)$, $LiCF_3SO_3$, $LiCH_3SO_3$, $LiN(SO_2CF_3)_2$, $LiC(CF_3SO_2)_3$, $LiN(SO_2C_2F_5)_2$, $LiClO_4$, $LiAsF_6$, $Li_2(B_{12}X_{12-i}H_i)$, $Li_2(B_{10}X_{10-I'}H_{I'})$, wherein X is independently at each occurrence a halogen, I is an integer from 0 to 12 and I' is an integer from 0 to 10, 1,3,2-dioxathiolane 2,2-dioxide, 4-methyl-1,3,2-dioxathiolane 2,2-dioxide, 4-(trifluoromethyl)-1,3,2-dioxathiolane 2,2-dioxide, 4-fluoro-1,3,2-dioxathiolane 2,2-dioxide, 4,5-difluoro-1,3,2-dioxathiolane 2,2-dioxide, dimethyl sulfate, methyl (2,2,2-trifluoroethyl) sulfate, methyl (trifluoromethyl) sulfate, bis(trifluoromethyl) sulfate, 1,2-oxathiolane 2,2-dioxide, methyl ethanesulfonate, 5-fluoro-1,2-oxathiolane 2,2-dioxide, 5-(trifluoromethyl)-1,2-oxathiolane 2,2-dioxide, 4-fluoro-1,2-oxathiolane 2,2-dioxide, 4-(trifluoromethyl)-1,2-oxathiolane 2,2-dioxide, 3-fluoro-1,2-oxathiolane 2,2-dioxide, 3-(trifluoromethyl)-1,2-oxathiolane 2,2-dioxide, difluoro-1,2-oxathiolane 2,2-dioxide, 5H-1,2-oxathiole 2,2-dioxide, 2,5-dimethyl-1,4-dimethoxybenzene, 2,3,5,6-tetramethyl-1,4-dimethoxybenzene, 2,5-di-tert-butyl-1,4-dimethoxybenzene or a mixture of any two or more thereof, with the proviso that when used, the redox shuttle is not the same as the lithium salt, even though they perform the same function in the cell. That is, for example, if the lithium salt is $LiClO_4$, it may also perform the dual function of being a redox shuttle, however if a redox shuttle is included in that same cell, it will be a different material than $LiClO_4$.

The electrochemical devices may include a cathode. The cathode includes a cathode active material which may be, but is not limited to, a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1+x'}Ni_hMn_kCo_lMe^2_{y'}O_{2-z'}F_{z'}$, $VO_2$ or $E_{x''}F_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein 0≤x≤0.3; 0≤y≤0.5; 0≤z≤0.5; 0≤m≤2; 0≤n≤2; 0≤x'≤0.4; 0≤α≤1; 0≤β≤1; 0≤γ≤1; 0≤ h≤1; 0≤k≤1; 0≤l≤1; 0≤y'≤0.4; 0≤z'≤0.4; and 0≤x"≤3; with the proviso that at least one of h, k and l is greater than 0. In some embodiments, the cathode active material includes $Li_{1+w}Mn_xNi_yCo_zO_2$ wherein w, x, y, and z satisfy the relations 0<w<1, 0≤x<1, 0≤y<1, 0≤z<1, and x+y+z=1. In some embodiments, the cathode active material includes $LiMn_xNi_yO_4$ wherein x and y satisfy the 0≤x<2, 0≤y<2, and x+y=2. In some embodiments, the positive electrode includes $LiMn_xNi_yO_4$ wherein x and y satisfy the 0≤x<2, 0≤y<2, and x+y=2. In some embodiments, the positive electrode includes $xLi_2MnO_3 \cdot (1-x))LiMO_2$ is wherein 0≤x<2. In some embodiments, the cathode includes a cathode active material that is $LiMn_{0.5}Ni_{0.5}O_2$, $LiCoO_2$, $LiNiO_2$, $LiNi_{1-x}Co_yMn_zO_2$, or a combination of any two or more thereof. In some embodiments, the cathode includes a cathode active material that is $LiNi_\alpha Mn_\beta Co_\gamma O_2$, NMC111 ($LiNi_{0.33}Co_{0.33}Mn_{0.33}O_2$), NMC532 ($LiNi_{0.5}Co_{0.2}Mn_{0.3}O_2$), NMC622 ($LiNi_{0.6}Co_{0.2}Mn_{0.2}O_2$), NMC811 ($LiNi_{0.8}Co_{0.1}Mn_{0.1}O_2$) or a Ni-rich layer material such as $Li_{1+x'}Ni_hMn_kCo_lMe^2_{y'}O_{2-z'}F_{z'}$ where 0≤h≤1. In some embodiments, the cathode comprises $LiMn_{0.5}Ni_{0.5}O_2$, $LiCoO_2$, $LiNiO_2$, $LiNi_{1-x}Co_yMn_zO_2$, or a combination of any two or more thereof, wherein 0≤x≤0.3; 0≤y≤0.5; 0≤z≤0.5.

The term "spinel" refers to a manganese-based spinel such as, $Li_{1+x}Mn_{2-y}Me_zO_{4-h}A_k$, wherein Me is Al, Mg, Ti, B, Ga, Si, Ni, or Co; A is S or F; and wherein 0≤x≤0.5, 0≤y≤0.5, 0≤z≤0.5, 0≤h≤0.5, and 0≤k≤0.5.

The term "olivine" refers to an iron-based olivine such as, $LiFe_{1-x}Me_yPO_{4-h}A_k$, wherein Me is Al, Mg, Ti, B, Ga, Si, Ni, or Co; A is S or F; and wherein 0≤x≤0.5, 0≤y≤0.5, 0≤h≤0.5, and 0≤k≤0.5.

The cathode may be further stabilized by surface coating the active particles with a material that can neutralize acid or otherwise lessen or prevent leaching of the transition metal ions. Hence, the cathodes may also include a surface coating of a metal oxide or fluoride such as $ZrO_2$, $TiO_2$, $ZnO_2$, $WO_3$, $Al_2O_3$, MgO, $SiO_2$, $SnO_2$, $AlPo_4$, $Al(OH)_3$, $AlF_3$, $ZnF_2$, $MgF_2$, $TiF_4$, $ZrF_4$, a mixture of any two or more thereof, of any other suitable metal oxide or fluoride. The coating can be applied to a carbon coated cathode.

The cathode may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

The electrodes of the electrochemical cells (i.e. the lithium batteries) may also include a current collector. Current collectors for either the anode or the cathode may include those of copper, stainless steel, titanium, tantalum, platinum, gold, aluminum, nickel, cobalt, cobalt nickel alloy, highly alloyed ferritic stainless steel containing molybdenum and chromium; or nickel-, chromium-, or molybdenum containing alloys.

The electrodes (i.e., the cathode and/or the anode) may also include a conductive polymer. Illustrative conductive polymers include, but not limited to, polyaniline, polypyrrole, poly(pyrrole-co-aniline), polyphenylene, polythiophene, polyacetylene, polysiloxane, polyvinylidene difluoride, or polyfluorene.

The electrochemical cells disclosed herein also includes a porous separator to separate the cathode from the anode and prevent, or at least minimize, short-circuiting in the device. The separator may be a polymer or ceramic or mixed separator. The separator may include, but is not limited to, polypropylene (PP), polyethylene (PE), trilayer (PP/PE/PP), or polymer films that may optionally be coated with alumina-based ceramic particles.

As an example of the electrochemical cells described herein are lithium secondary batteries. The lithium secondary batteries described herein may find application as a lithium battery or a lithium-air battery. The lithium secondary batteries described herein may find application as a lithium battery that is other than a lithium-sulfur battery. In any of the electrochemical cells described herein, it may be subject to the proviso that it is not a lithium-sulfur battery.

The present invention, thus generally described, will be understood more readily by reference to the following examples, which are provided by way of illustration and are not intended to be limiting of the present invention.

EXAMPLES

Example 1

A Li/Li symmetric cell is prepared by is assembled with lithium metal as both counter and reference electrode in an argon atmosphere glovebox (<1 ppm of $O_2$ and $H_2O$). The charging/discharging rate is 2 mAhcm$^{-2}$. The electrolyte includes 1M lithium bis(trifluoromethanesulfonyl)imide (LiTFSI) in solvents of, individually, (A) fluorinated diethylene glycol (FDG), (B) diethylene glycol (DG), and (C) 1 NM3. For clarity, the structures of the solvents used are:

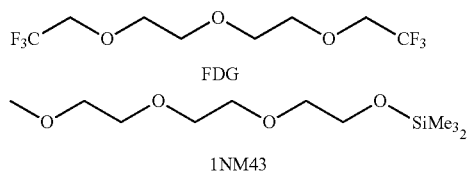

FDG

1NM43

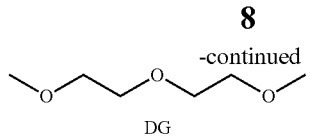

DG

Example 2

Cycling of the cells prepared in Example 1. The cells prepared above in Example 1 were cycled at a current density of 2 mAcm$^2$. As illustrated in FIG. 1, the charge/discharge voltage stabilized at about 0.5 V for the cells using the FDG-based electrolyte, while the charge/discharge voltages for DG- and 1NM3-based electrolytes were large and highly fluctuating. These results clearly show that FDG electrolyte enables a much more stable lithium plating and stripping than DG and 1NM3 electrolytes.

Example 3

Li/Li symmetric cells were prepared as in Example 1, but with 1.2M $LiPF_6$ using a 3:7 (wt/wt) ratio of (D) ethylene carbonate to ethylmethyl carbonate, (E) FEC to DG, and (F) FEC to FDG.

Example 4

Figure 2:
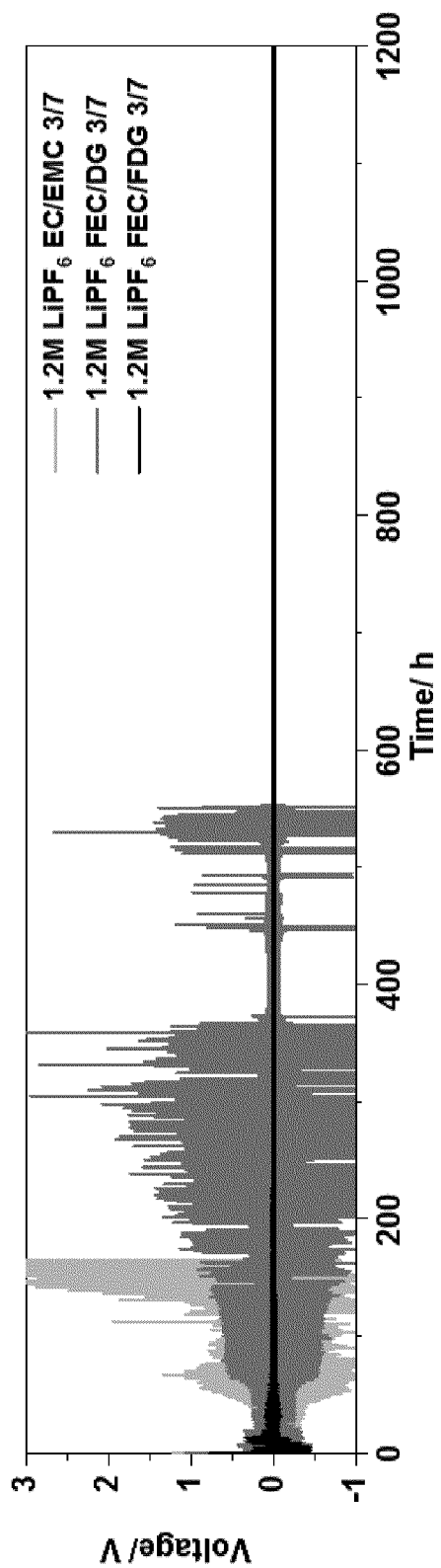
FIG. 2 is a graph of cycling performance of Li/Li symmetric cells using different binary electrolytes, according to Example 4.
Figure 3A:
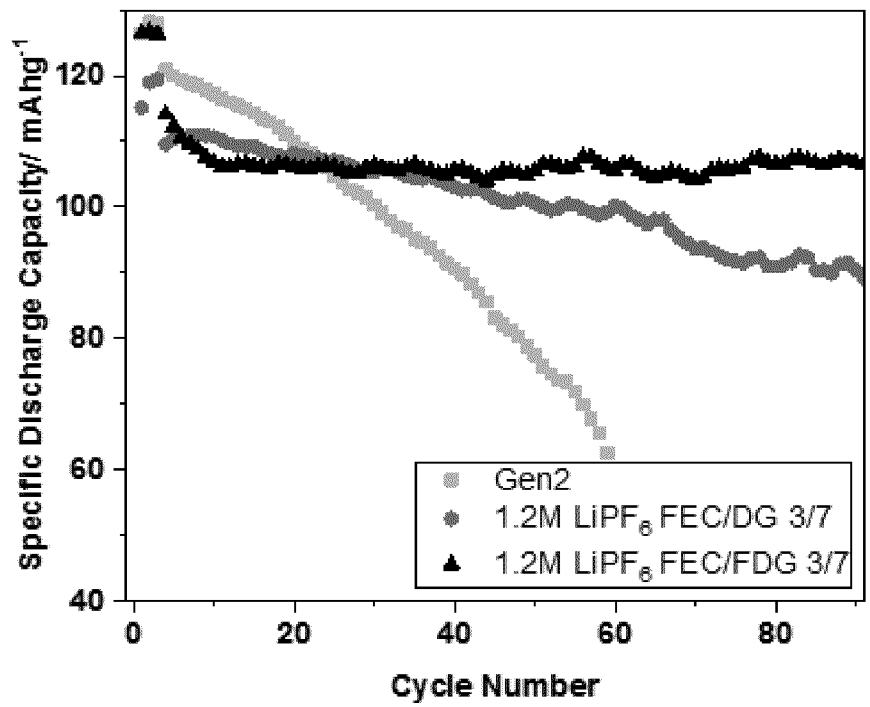
FIG. 3A is a graph of capacity retention.
Figure 3B:
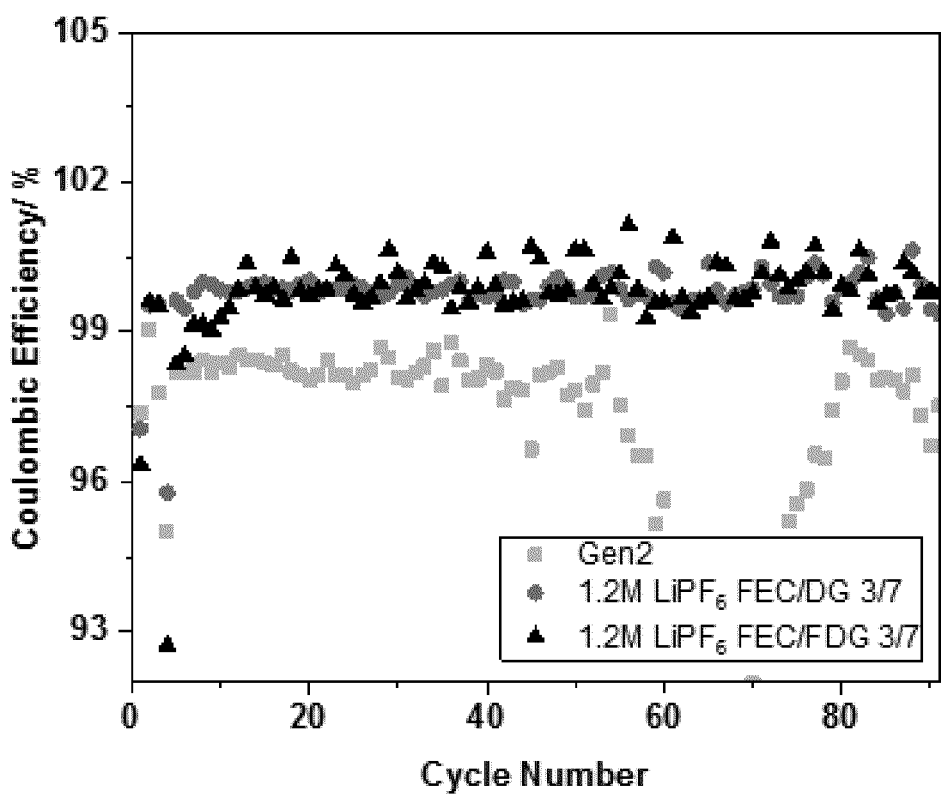
FIG. 3B illustrates the corresponding Coulombic efficiency of Li/LCO cell using different electrolytes, according to Example 5.

Cycling of the cells prepared in Example 3. The cells prepared above in Example 3 were cycled at a current density of 2 mAcm$^2$. As illustrated in FIG. 2 a graph of cycling performance is provided for the cells using the different mixed solvent electrolytes. With the addition of the cyclic carbonate FEC as a co-solvent, the FEC/FDG electrolyte exhibited improved stability in the lithium plating and stripping indicated by the stable and small charge/discharge voltage (20 mV). Meanwhile, the charge/discharge voltage of the Li/Li cell using FEC/DG electrolyte was fluctuating and the voltage was considerably larger (1 V). The worst symmetric cell result came from the cell using conventional electrolyte ethylene carbonate and ethylmethyl carbonate mixture ("Gen2"), where the charge/discharge voltage was as high as 5V.

Example 5

2032 coin cells of Li/LCO (lithium cobalt oxide) were prepared with an LCO positive electrode (1.90 mAh cm$^{-2}$ areal capacity), a foil of Li metal anode, one piece of separator (Celgard 2325), and the prepared electrolyte (40 μL in each cell). The Li/LCO cells were prepared in an argon atmosphere glovebox (<1 ppm of $O_2$ and $H_2O$). The electrolytes included those as used in Example 3 as D, E, and F. The cycling performance of the Li/LCO cells illustrates that the capacity of the cell with the conventional ("Gen2") electrolyte decayed rapidly and lost almost all capacity within 70 cycles due to lithium dendrite formation. Meanwhile, the 90-cycle capacity retention of the Li/LCO cell employing the FEC/DG electrolyte was 80% with an average Coulomblic efficiency of 99.83%, indicating that FEC/DG electrolyte enabled more stable cycling of Li/LCO system. Outstanding cycling performance of the Li/LCO system was obtained from the cell using the FEC/FDG electrolyte. The 90-cycle capacity retention for this cell was 93% and the average Coulombic efficiency was 99.90%. These results, together with the symmetric cell data, strongly supported the beneficial effect of fluorinated glyme in stabilizing the cycling of lithium metal anode in lithium-ion battery.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:
   a cathode comprising a cathode active material;
   an anode comprising silicon, a graphite, lithium metal, or a combination of any two or more thereof;
   a separator; and
   an electrolyte comprising a lithium salt and a fluorinated glycol ether and a fluorinated cyclic carbonate;
   wherein:
   the fluorinated glycol ether is a compound represented as Formula I:
   $$R^1(O(CH_2)_m)_x(O(CH_2)_n)_yOR^2 \quad (I);$$
   $R^1$ is fluorinated alkyl;
   $R^2$ is fluorinated alkyl;
   m is 1, 2, 3, or 4;
   n is 0, 1, 2, 3, or 4;
   x is 2 to 10; and
   y is 0.

2. The electrochemical cell of claim 1, wherein $R^1$ and $R^2$ are at least difluorinated alkyl.

3. The electrochemical cell of claim 1, wherein $R^1$ and $R^2$ are at least trifluorinated alkyl.

4. The electrochemical cell of claim 1, wherein $R^1$ and $R^2$ are individually $-(CH_2)_q(CR^4R^5)_pC(R^3)_3$; each $R^3$, $R^4$, and $R^5$ is individually H or F, with the proviso that at least one of $R^3$, $R^4$, and $R^5$ is F; q is 0, 1, 2, or 3; and p is 0, 1, 2, 3, 4, 5, or 6.

5. The electrochemical cell of claim 1, wherein $R^1$ and $R^2$ are individually $-(CH_2)_q(CR^4R^5)_pC(R^3)_3$; $R^3$ is F; q is 1 or 2; and p is 0.

6. The electrochemical cell of claim 1, wherein $R^1$ and $R^2$ are individually $-(CH_2)_q(CR^4R^5)_pC(R^3)_3$; each $R^3$, $R^4$, and $R^5$ is individually H or F, with the proviso that at least one of $R^3$, $R^4$, and $R^5$ is F; y is 0; x is 2, 3, 4, 5, or 6; m is 1, 2, or 3; q is 0, 1, 2, or 3; and p is 0, 1, 2, 3, 4, 5, or 6.

7. The electrochemical cell of claim 1, wherein $R^1$ and $R^2$ are individually $-(CH_2)_q(CR^4R^5)_pC(R^3)_3$; $R^3$ is F; y is 0; x is 2, 3, or 4; m is 1, 2, or 3; q is 1 or 2; and p is 0.

8. The electrochemical cell of claim 1, wherein $R^1$ and $R^2$ are individually $-(CH_2)_q(CR^4R^5)_pC(R^3)_3$; q is 1; p is 0; $R^3$ is F; y is 0; x is 2 or 3; and m is 2.

9. The electrochemical cell of claim 1, wherein the fluorinated cyclic carbonate is a compound represented as Formula (II):

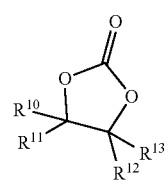

wherein:
each of $R^{10}$, $R^{11}$, $R^{12}$, and $R^{13}$ is individually, H, F, Cl, Br, I, CN, $NO_2$, alkyl, alkenyl, aryl, aralkyl, heterocyclyl, heteroaryl, or heteroaralkyl, with the proviso that at least one of $R^{10}$, $R^{11}$, $R^{12}$, and $R^{13}$ is F or contains F.

10. The electrochemical cell of claim 9, wherein each of $R^{10}$, $R^{11}$, $R^{12}$, and $R^{13}$ is individually, H, F, $C_1$-$C_8$ alkyl, or $C_1$-$C_8$ fluoroalkyl.

11. The electrochemical cell of claim 10, wherein each of $R^{10}$, $R^{11}$, and $R^{12}$ are H and $R^{13}$ is F; or wherein each of $R^{10}$ and $R^{11}$ are H, and $R^{12}$ and $R^{13}$ are F; or wherein each of $R^{11}$ and $R^{12}$ are H, and $R^{10}$ and $R^{13}$ are F; or wherein any 3 of $R^{10}$, $R^{11}$, $R^{12}$ and $R^{13}$ are F while the remaining one is H; or wherein each of $R^{10}$, $R^{11}$, $R^{12}$, and $R^{13}$ are F.

12. The electrochemical cell of claim 1, wherein fluorinated cyclic carbonate is,

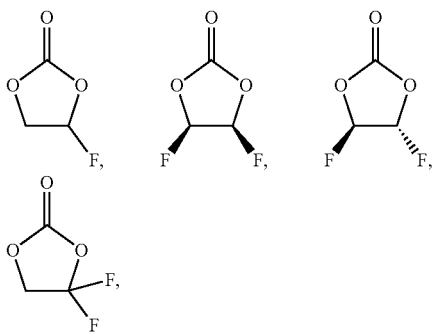

or a mixture of any two or more thereof.

13. The electrochemical cell of claim 1 further comprising an electrolyte stabilizing additive that is $LiBF_2(C_2O_4)$, $LiB(C_2O_4)_2$, $LiPF_2(C_2O_4)_2$, $LiPF_4(C_2O_4)$, $LiPF_6$, $LiAsF_6$, CsF, $CsPF_6$, $LiN(SO_2CF_3)_2$, $LiN(SO_2F)_2$, $Li_2(B_{12}X_{12-i}H_i)$; $Li_2(B_{10}X_{10-i'}H_{i'})$; or a mixture of any two or more thereof;
wherein X is independently at each occurrence a halogen, i is an integer from 0 to 12 and i' is an integer from 0 to 10.

14. The electrochemical cell of claim 1, wherein the lithium salt is $LiBF_2(C_2O_4)$; $LiB(C_2O_4)_2$; $LiPF_2(C_2O_4)_2$; $LiPF_4(C_2O_4)$; $LiPF_6$; lithium 4,5-dicyano-2-(trifluoromethyl)imidazole; lithium 4,5-dicyano-2-methylimidazole; trilithium 2,2',2''-tris(trifluoromethyl)benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiPF_2(C_2O_4)_2$; $LiPF_4(C_2O_4)$; $LiB(C_2O_4)_2$; $LiBF_2(C_2O_4)_2$; $Li_2(B_{12}X_{12-i}H_i)$; $Li_2(B_{10}X_{10-i'}H_{i'})$; and a mixture of any two or more thereof, wherein X is independently at each occurrence a halogen, i is an integer from 0 to 12 and i' is an integer from 0 to 10.

15. The electrochemical cell of claim 1, wherein the electrolyte further comprises an aprotic gel polymer.

16. The electrochemical cell of claim 1 which is a lithium secondary battery.

17. The electrochemical cell of claim 16, wherein the secondary battery is a lithium battery or a lithium-air battery.

18. The electrochemical cell of claim 1, wherein the cathode active material comprises a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1-x}Ni_hMn_kCo_lMe^2_{y'}O_{2-z'}F_{z''}$, $VO_2$ or $E_{x''}F_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0 \leq x \leq 0.3$; $0 \leq y \leq 0.5$; $0 \leq z \leq 0.5$; $0 \leq m \leq 2$; $0 \leq n \leq 2$; $0 \leq x' \leq 0.4$; $0 \leq \alpha \leq 1$; $0 \leq \beta \leq 1$; $0 \leq \gamma \leq 1$; $0 \leq h \leq 1$; $0 \leq k \leq 1$; $0 \leq l \leq 1$; $0 \leq y' \leq 0.4$; $0 \leq z' \leq 0.4$; and $0 \leq x'' \leq 3$; with the proviso that at least one of h, k and l is greater than 0.

19. An electrochemical cell comprising:
a cathode comprising a cathode active material;
an anode comprising silicon, a graphite, lithium metal, or a combination of any two or more thereof;
a separator; and
an electrolyte comprising a lithium salt and a fluorinated glycol ether and a fluorinated cyclic carbonate;
wherein:
the fluorinated glycol ether is a compound represented as Formula I:
$R^1(O(CH_2)_m)_x(O(CH_2)_n)_yOR^2$ (I);
$R^1$ and $R^2$ are individually $-(CH_2)_qCF_3$;
q is 1 or 2;
m and n are individually 0, 1, 2, 3, or 4; and
x and y are 0 to 10, with the proviso that both x and y are not 0.

* * * * *